United States Patent
Poertzgen et al.

(10) Patent No.: US 10,233,986 B2
(45) Date of Patent: Mar. 19, 2019

(54) ELECTROMECHANICALLY AND HYDRAULICALLY ACTUATABLE MOTOR VEHICLE BRAKE WITH SELECTIVE SELF-LOCKING

(71) Applicant: Lucas Automotive GmbH, Koblenz (DE)

(72) Inventors: Gregor Poertzgen, Koblenz (DE); Steve Scherer, Bilkheim (DE); Christian Dilla, Bendorf (DE); Erwin Michels, Kail (DE); Benedikt Ohlig, Vallendar (DE)

(73) Assignee: Lucas Automotive GmbH, Koblenz (DE)

( * ) Notice: Subject to any disclaimer, the term of this patent is extended or adjusted under 35 U.S.C. 154(b) by 171 days.

(21) Appl. No.: 15/035,257

(22) PCT Filed: Oct. 24, 2014

(86) PCT No.: PCT/EP2014/072819
§ 371 (c)(1),
(2) Date: May 9, 2016

(87) PCT Pub. No.: WO2015/071071
PCT Pub. Date: May 21, 2015

(65) Prior Publication Data
US 2016/0273602 A1 Sep. 22, 2016

(30) Foreign Application Priority Data
Nov. 12, 2013 (DE) ........................ 10 2013 018 946

(51) Int. Cl.
*F16D 65/18* (2006.01)
*B60T 13/58* (2006.01)
(Continued)

(52) U.S. Cl.
CPC ............ *F16D 65/18* (2013.01); *B60T 13/588* (2013.01); *B60T 13/741* (2013.01);
(Continued)

(58) Field of Classification Search
CPC .. F16D 65/18; F16D 2121/04; F16D 2121/50; F16D 2127/06; B60T 13/741
See application file for complete search history.

(56) References Cited

U.S. PATENT DOCUMENTS

| 5,829,845 A | 11/1998 | Maron et al. |
| 6,012,556 A | 1/2000 | Blosch et al. |

(Continued)

FOREIGN PATENT DOCUMENTS

| DE | 19654729 A1 | 7/1999 |
| DE | 19851670 A1 | 5/2000 |

(Continued)

OTHER PUBLICATIONS

International Search Report and the Written Opinion, Application No. PCT/EP2014/072819 filed Oct. 24, 2014, dated Aug. 12, 2015.

(Continued)

*Primary Examiner* — Vishal R Sahni
(74) *Attorney, Agent, or Firm* — MacMillan, Sobanski & Todd, LLC

(57) ABSTRACT

A motor vehicle brake, in particular a combined hydraulically and electromechanically actuatable motor vehicle brake, with an actuator assembly comprising: a housing, an actuator which can be moved relative to the housing for hydraulically or electromechanically moving a brake lining, a motor drive, a movement mechanism which is arranged between the motor drive and the movable actuator, a gear arrangement which is paired with the movement mechanism, and a separate self-locking device which is designed to block the movement mechanism when necessary, wherein (Continued)

the movement mechanism has a ball screw drive with a rotatable spindle and a nut which can be moved in the housing in a linear manner. The nut can be moved within the housing in order to move the actuator by rotating the spindle, and the gear arrangement has at least two gear stages. In the motor vehicle brake, the self-locking device is arranged in or on the gear arrangement such that at least two gear stages are arranged between the ball screw drive and the self-locking device.

6 Claims, 7 Drawing Sheets

(51) Int. Cl.
*B60T 13/74* (2006.01)
*F16D 121/04* (2012.01)
*F16D 121/24* (2012.01)
*F16D 125/36* (2012.01)
*F16D 125/40* (2012.01)
*F16D 125/48* (2012.01)

(52) U.S. Cl.
CPC ...... *F16D 2121/04* (2013.01); *F16D 2121/24* (2013.01); *F16D 2125/36* (2013.01); *F16D 2125/40* (2013.01); *F16D 2125/48* (2013.01)

(56) References Cited

U.S. PATENT DOCUMENTS

| | | | |
|---|---|---|---|
| 6,321,884 B1 * | 11/2001 | Balz | B60T 7/12 188/161 |
| 6,405,836 B1 * | 6/2002 | Rieth | F16D 65/18 188/158 |
| 6,536,561 B1 | 3/2003 | Keller | |
| 8,051,957 B2 * | 11/2011 | Giering | B60T 13/741 188/72.8 |
| 8,118,149 B2 | 2/2012 | Cao et al. | |
| 8,616,348 B2 * | 12/2013 | Winkler | F16D 65/18 188/196 V |
| 9,850,971 B1 * | 12/2017 | Demorais | F16D 65/18 |
| 2002/0185340 A1 * | 12/2002 | Kojima | B60T 13/741 188/72.8 |
| 2005/0109567 A1 | 5/2005 | Baumann et al. | |
| 2006/0131113 A1 * | 6/2006 | Christof | B60T 7/045 188/72.1 |
| 2006/0180413 A1 * | 8/2006 | Halasy-Wimmer | B60T 13/741 188/158 |
| 2007/0062769 A1 * | 3/2007 | Noh | B60T 13/588 188/265 |
| 2013/0075205 A1 * | 3/2013 | Sakashita | F16D 65/18 188/72.3 |
| 2013/0178325 A1 * | 7/2013 | Ruder | F16D 49/00 475/270 |
| 2014/0166413 A1 * | 6/2014 | Giering | B60T 13/741 188/156 |

FOREIGN PATENT DOCUMENTS

| | | |
|---|---|---|
| DE | 10349078 A1 | 5/2005 |
| DE | 102006000746 A1 | 7/2007 |
| DE | 102012208294 A1 | 11/2012 |
| DE | 102011102860 A1 | 12/2012 |
| WO | 2008/037738 A1 | 4/2008 |
| WO | 2009/046899 A1 | 4/2009 |

OTHER PUBLICATIONS

International Preliminary Report on Patentability, Application No. PCT/EP2014/072819 filed Oct. 24, 2014, dated Feb. 19, 2016.

\* cited by examiner

ELECTROMECHANICALLY AND HYDRAULICALLY ACTUATABLE MOTOR VEHICLE BRAKE WITH SELECTIVE SELF-LOCKING

CROSS-REFERENCE TO RELATED APPLICATIONS

This application is a national stage of International Application No. PCT/EP2014/072819, filed Oct. 24, 2014, the disclosures of which are incorporated herein by reference in entirety, and which claimed priority to German Patent Application No. 10 2013 018 946.2, filed Nov. 12, 2013, the disclosures of which are incorporated herein by reference in entirety.

BACKGROUND OF THE INVENTION

The invention relates to an electromechanically and hydraulically actuatable motor-vehicle brake with an actuator assembly comprising:
a housing,
an actuator, displaceable relative to the housing, for hydraulic or electromechanical displacement of a brake pad,
a motor drive,
a displacement mechanism arranged between the motor drive and the displaceable actuator,
a gear arrangement assigned to the displacement mechanism, and
a separate self-locking device which is designed to block the displacement mechanism as needed,
wherein the displacement mechanism exhibits a ball screw with a spindle and a nut, wherein optionally one component from spindle and nut is capable of being driven in rotation and the respective other component from spindle and nut is capable of being linearly displaced within the housing for the purpose of displacing the actuator by driving in rotation the one component from spindle and nut, and wherein the gear arrangement exhibits at least two gear stages.

For some time, motor-vehicle brakes have been employed in which, in the case of a normal service braking during the travel of the vehicle, the brake pads are displaced hydraulically in the usual way, but in which for the purpose of activating a parking-brake function an electromechanical displacement of the brake pads or at least an electromechanically triggered blocking of the brake pads in a braking position also occurs. Motor-vehicle brakes of such a type offer the advantage that the parking-brake function can be activated or released more conveniently by simple actuating of an activating switch.

Electromechanically and hydraulically actuatable motor-vehicle brakes of such a type are known from the state of the art.

For instance, document WO 2008/037738 A1 describes a motor-vehicle brake that can be actuated both hydraulically and electromechanically. In a normal operating situation—that is to say, during the travel of the motor vehicle—this motor-vehicle brake is actuated hydraulically in conventional manner. For the purpose of activating a parking brake, however, the electromechanical actuation function is activated. In this case an electric motor is driven which drives a spindle/nut arrangement via a displacement mechanism with a gear arrangement. The gear arrangement is designed to be self-locking with a worm gear, in order to prevent the parking-brake action from diminishing when the parking brake has been activated. But the self-locking has the disadvantage that only very low efficiencies can be attained, so that the components, in particular the electric motor, have to be designed to be relatively strong and have a high current consumption. It is considered that the overall efficiency of the system is made up of a product of the individual efficiencies of the components. For instance, this overall efficiency results from the product of the efficiency of the engine, the efficiency of the downstream gear arrangement and of the spindle/nut arrangement. In gear arrangements with self-locking effect, overall efficiencies can accordingly only be attained within the range of 30% and less.

Document DE 10 2012 208 294 A1 describes a vehicle brake in which a separate self-locking device is arranged directly on the spindle/nut arrangement. In particular, reference is made to FIG. 8 of this document. Therein it is shown that the self-locking device designated as coupling device 41 is arranged between the rolling-element ramp transmission and the brake piston. Such a direct spatial assignment of the self-locking device to the nut/spindle arrangement of a ball screw has the disadvantage that the reaction forces arising in the course of the activation of the brake and in the course of the maintenance of a (parking) braking state have to be borne in their full magnitude by the self-locking device. The self-locking device has to be constructed to be correspondingly sturdy, having the consequence that it takes up considerable construction space. This has the result that the brake has to be dimensioned to be relatively large, particularly in the axial direction with respect to the threaded spindle.

Furthermore, document DE 10 2011 102 860 A1 presents a vehicle brake which has been improved in comparison with this state of the art, in which the self-locking device is in fact arranged close to the nut/spindle arrangement but is integrated into the gear arrangement, so that construction space can be saved in the axial direction with respect to the threaded spindle. This brake can be configured to be more compact.

Document DE 196 54 729 A1 discloses a motor-vehicle brake having the features of the precharacterising portion of Claim 1. Further state of the art is to be found in documents U.S. Pat. No. 5,829,845 A and DE 103 49 078 A1.

BRIEF SUMMARY OF THE INVENTION

A feature of the present invention is to make available a motor-vehicle brake that can be utilised both as service brake and as parking brake and that has been further optimised in comparison with the state of the art with regard to flux of force and dimensioning.

This feature is achieved by a motor-vehicle brake of the type characterised in the introduction, in which there is provision that the self-locking device is arranged in or on the gear arrangement in such a manner that at least two gear stages are arranged between the ball screw and the self-locking device.

The invention has the advantage that the at least two gear stages with their transmission ratio or reduction ratio can be exploited in order to reduce the reaction forces stemming from the brake pads, so that the self-locking device can be made smaller. Furthermore, the arrangement, according to the invention, of the self-locking device at a distance from the threaded spindle gives more freedom to make the entire motor-vehicle brake smaller, since the self-locking device can be arranged at a point where it requires less construction space.

A further advantage according to the invention consists in the fact that the overall efficiency of the vehicle brake can be improved in comparison with the state of the art, in particular because the gear arrangement or the ball screw itself no longer has to be constructed to be self-locking. Consequently, efficiencies of clearly above 50% can be attained for the transmission of force, which also contributes to the fact that the motor drive can be designed to have lower current consumption, to be weaker and hence also of smaller construction.

A preferred embodiment of the invention provides that the gear arrangement exhibits three or four gear stages. The choice of three or four gear stages makes it possible to achieve a relatively large transmission ratio to the benefit of a relatively small dimensioning of the motor drive, in which case the displacement mechanism can nevertheless be designed to be relatively compact. This number of gear stages also allows a favourable positioning of the self-locking device.

In this context, according to a practical variant of the invention there may be provision that the self-locking device is arranged between the motor drive and the gear arrangement. This means that the entire gear arrangement with all the gear stages is exploited for the purpose of reducing the reaction forces stemming from the brake pads. Accordingly, the self-locking device can be dimensioned to be very weak and space-saving, and yet performs its action reliably.

Almost similarly good effects can be achieved in a modification of this practical variant, in which there is provision that the self-locking device is positioned downstream of the gear stage of the gear arrangement nearest to the motor drive. In this practical variant, the self-locking device is capable of being integrated into the gear arrangement and utilises all the other gear stages, with the exception of the drive-side gear stage, for the purpose of reducing the reaction forces exerted by the brake pads in the braking state.

In accordance with the invention there is preferentially provision that the self-locking device is arranged in such a manner that the reaction forces arising in the course of blocking the displacement mechanism can be indirectly or directly diverted into the housing. In this context, a further development of the invention provides that the self-locking device diverts the reaction forces arising in the course of blocking the displacement mechanism into a housing portion assigned to the gear arrangement, said housing portion being connected in force-transmitting manner to a housing portion bearing the brake-pad arrangement. The housing portion bearing the brake-pad arrangement is, as a rule, designed to be somewhat sturdier, which is advantageous for absorbing the reaction forces from the self-locking device. Furthermore, there may be provision that the self-locking device diverts the reaction forces arising in the course of blocking the displacement mechanism directly into the sturdier housing portion bearing the brake-pad arrangement.

A preferred practical variant of the invention provides that the self-locking device is designed with a wrap-spring clutch which permits a transmission of torque from the motor drive to the spindle and which is designed for blocking a transmission of torque from the spindle to the motor drive. With such a wrap-spring clutch, high losses of efficiency can be avoided, since the wrap-spring clutch permits a largely direct and virtually loss-free transmission in its released state but reliably blocks in the closed state. In this context, in accordance with the invention there may be provision that a switching element is assigned to the wrap-spring clutch, which switching element in a first switching position permits a transmission of torque from the spindle to the motor drive and upon reaching a second switching position causes the wrap-spring clutch to block a transmission of torque from the spindle to the motor drive. Such a switching element may be, for example, a meandering spring.

In this context there may furthermore be provision that the wrap-spring clutch as a wrap spring exhibits a helical spring, wound around a stator which is fixed in relation to the housing, with at least one winding and with two ends, which with its one end can be coupled in torque-transmitting manner with a first gearwheel, and with its second end can be coupled in torque-transmitting manner with a second gearwheel. In this case the at least one winding is in contact with a surface of the stator. In this practical variant of the invention there is preferably provision that each of the gearwheels exhibits at least one pawl which can be brought into torque-transmitting engagement with the end of the helical spring respectively assigned to the gearwheel. The pawls serve, so to speak, for force-transmitting and torque-transmitting coupling of the respective gearwheel with the helical spring arranged between said gearwheels. The helical spring is the force-transmitting element which permits a transmission of force from the motor drive towards the spindle and which blocks in the opposite direction. According to one practical variant of the invention, this is obtained, in particular, in that in the course of a transmission of torque from the motor drive to the spindle the helical spring expands radially somewhat with respect to the stator which is fixed in relation to the housing, so that it slides on the stator securely in the course of the transmission of torque, and in that in the case of a transmission of torque from the spindle to the motor drive the helical spring contracts radially with respect to the stator which is fixed in relation to the housing, acting radially on the stator, fixed in relation to the housing, in such a manner that it blocks a transmission of torque. In the course of blocking, the helical spring accordingly tightens around the stator which is fixed in relation to the housing, and in this way provides for strong friction forces, as a consequence of the wrapping, which ultimately prevent a further movement and hence transmission of torque via the helical spring. In this state, said spring blocks the transmission.

If in a practical variant the motor-vehicle brake is employed both as service brake and as parking brake, for the function as service brake it may be necessary to permit a transmission of torque, within certain bounds, from the spindle towards the motor drive. But, for the stated reasons, such a transmission of torque should be prohibited within the scope of the parking-brake function. This means that opposing requirements, so to speak, exist for the function as service brake and for the function as parking brake. In one practical variant, the present invention removes the differentiation between service-brake function and parking-brake function by exploiting the fact that for the purpose of activating the parking brake significantly higher torques or tensional forces are ordinarily employed than within the scope of the service-brake function. Depending on the magnitude or absolute value of the tensional forces employed, 'switching' between service-brake function and parking-brake function can accordingly take place. Structurally, this switching is obtained by virtue of the fact that in this practical variant a switching element is assigned to the wrap-spring clutch, which switching element in a first switching position permits a transmission of torque from the spindle to the motor drive and upon reaching a second switching position causes the wrap-spring clutch to block a transmission of torque from the spindle to the motor drive. This switching element switches in a manner depending on the tensional force acting. In accordance with the invention, it is possible in this connection that the switching element includes at least one elastic deformation element. The at least one deformation element allows a transmission of force, within the bounds of a certain degree of deformation, in both directions between motor drive and spindle. Starting from a certain deformation induced by tensional force, the at least one deformation element reaches the second switching position in which a transmission of force then continues to be possible from the motor drive towards the spindle but is blocked in the opposite direction. In particular, in this case there may be provision that the switching element assumes its first or second switching position in accordance with a tensional force acting on the wrap spring between the first gearwheel and the second gearwheel.

The invention provides that the gear arrangement exhibits a planetary gear mechanism. Furthermore, there is provision that the motor drive exhibits an electric motor, the output shaft of which exhibits a sun wheel of the planetary gear mechanism, in which connection a ring gear of the planetary gear mechanism is arranged to be fixed in relation to the housing, and in which connection planet wheels of the planetary gear mechanism are rotatably supported on a planet carrier which is rotatably supported in the housing. In this case it is in accordance with the invention, that the self-locking device is integrated into a sun wheel of the planetary gear mechanism.

Other advantages of this invention will become apparent to those skilled in the art from the following detailed description of the preferred embodiments, when read in light of the accompanying drawings.

DETAILED DESCRIPTION OF THE INVENTION

Figure 1:
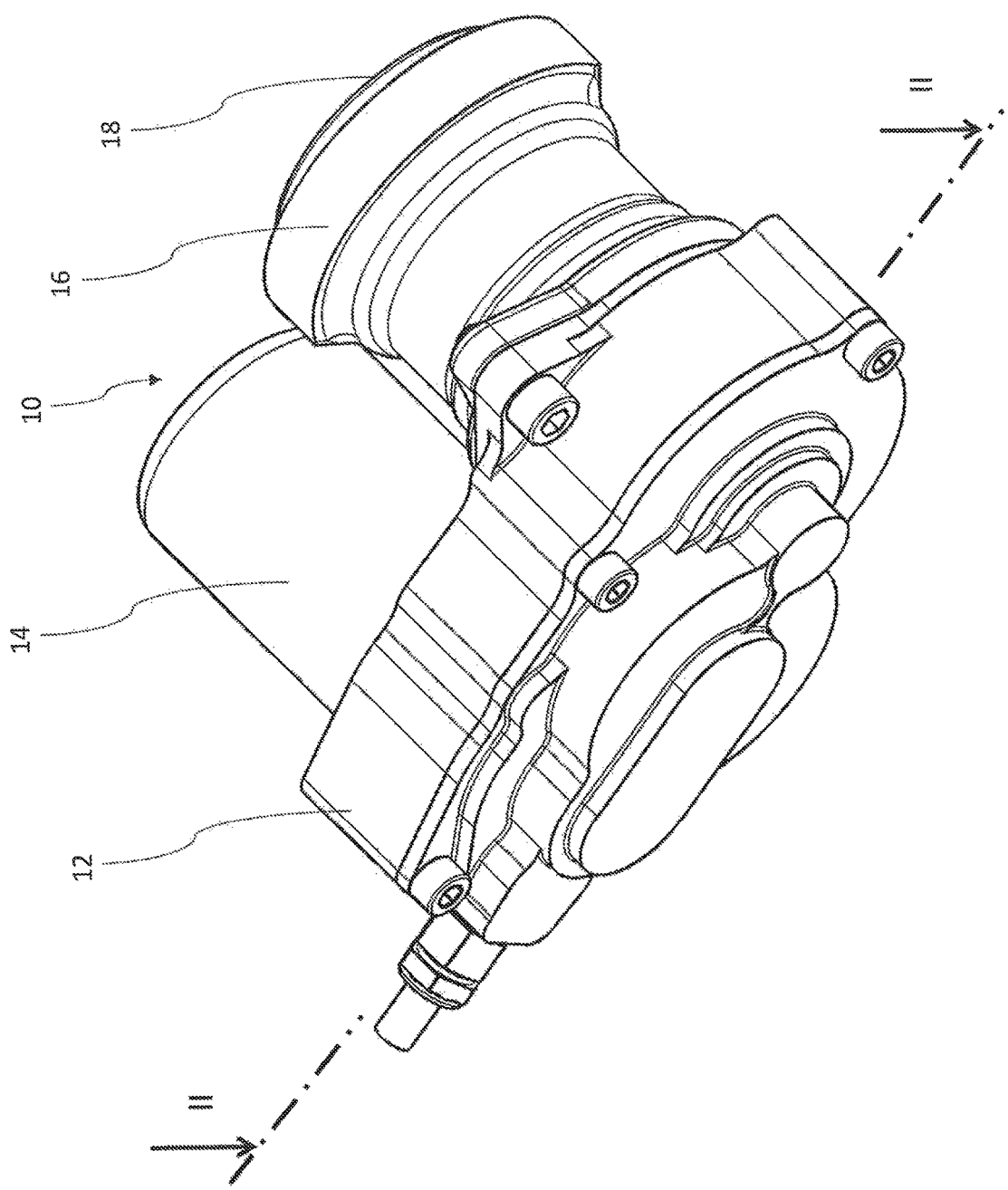
FIG. 1 is a spatial exterior view of an actuator assembly for elucidating the technical background of the motor-vehicle brake according to the invention.

In FIG. 1 an actuator assembly of a motor-vehicle brake is shown in spatial representation and denoted generally by 10. FIGS. 1-5 serve for elucidation of the technical background of the invention. The actual exemplary embodiments will be described with reference to FIGS. 6 and 7.

FIG. 1 shows a housing 12, in which a gear arrangement is arranged, as well as a partial housing 14 for accommodating a drive motor, and a further partial housing 16 in which a displaceable piston 18 is arranged, with which a brake pad, not shown, in a brake unit of a motor-vehicle brake can be displaced so as to be effective as a brake. The actuator assembly 10, shown in FIG. 1, of the motor-vehicle brake according to the invention can be installed in conventional manner, for example in a floating-calliper brake. In this regard, reference is made to document WO 2009/046899 A1, where such an installation situation is shown by way of example. This document is an application from the present applicant. Since in the following it is a matter of the actuator assembly consisting of motor drive and displacement mechanism for displacing the brake pad, the following description concentrates on these components. Also in the Figures, only corresponding components are shown.

Figure 2:
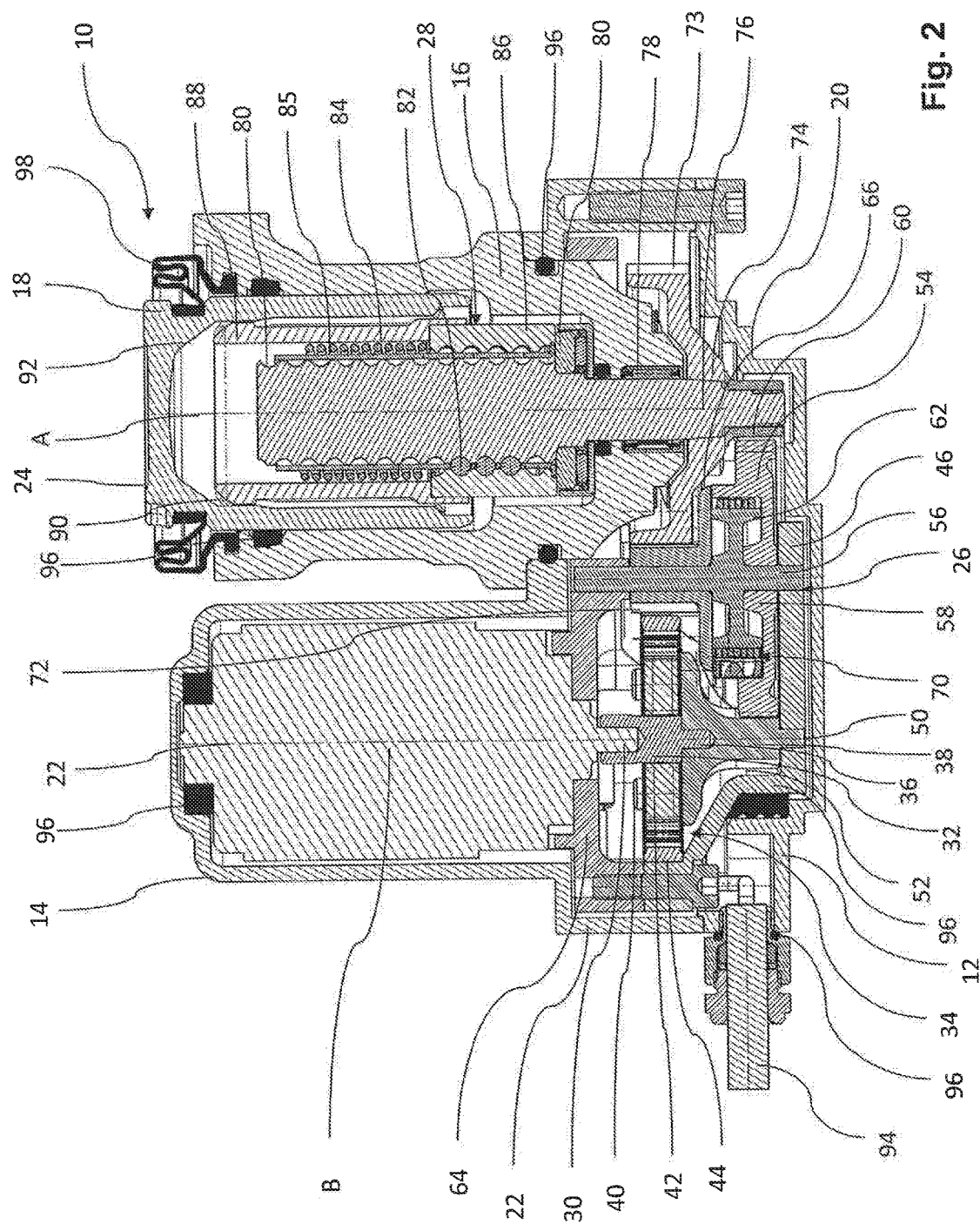
FIG. 2 is an axis-including sectional view through the actuator assembly of the motor-vehicle brake according to FIG. 1.

FIG. 2 shows an axis-including cross-sectional view through the drive unit 10 shown in FIG. 1. It will be discerned that the housing 12 has been constructed from many parts and is composed of a housing cover 20, the partial housing 14 for reception of an electric motor 22, and the partial housing 16 for displaceable reception of the piston 18. The piston 18 is hydraulically and electromechanically displaceable along the longitudinal axis A in a manner known as such. Its exposed surface 24 cooperates in conventional manner with a brake-pad arrangement, not shown, for the purpose of achieving a braking action. A hydraulic displacement occurs in known manner during service braking. An electromechanical displacement occurs for the purpose of activating and releasing the parking-brake function.

The electromechanical displacement mechanism will be discussed in detail in the following.

The displacement mechanism includes a gear arrangement 26 and also a nut/spindle arrangement 28. The two basic components of the displacement mechanism have been represented, cut away, in FIG. 3 together with the electric motor 22. The gear arrangement 26 serves to convert a rotary motion of the electric motor 22 into a corresponding linear motion of the piston 18 along the longitudinal axis A. In detail, the electric motor 22 exhibits a motor output shaft 30 extending along the longitudinal axis B of the motor. Said shaft is coupled in torsion-resistant manner with a toothed wheel 32. The toothed wheel 32 serves as sun wheel of a planetary gear 34. The toothed wheel 32 exhibits a journal 36 in its end remote from the motor. On this journal 36 a planet carrier 38 is rotatably supported which, in turn, again exhibits several journals 40. The journals 40 serve to support planet wheels 42 which are in meshing engagement with the toothed wheel 32.

Radially outside the planet wheels 42 a ring gear 44 is arranged which is fixed in relation to the housing. A further housing part 46 serves for this purpose. The planet carrier 38 is rotatably supported in this housing part 46 with a journal 50. Said planet carrier exhibits, between the journals 40 and its journal 50, an external tooth gearing 52. This external tooth gearing 52 meshes with a first gearwheel 54 which is rotatably supported on a stator 56, fixed in relation to the housing, via a radially inner bearing portion 58, and exhibits on its outer periphery an external tooth gearing 60. The gearwheel 54 is pot-shaped. In the interior of said gearwheel there extends a friction-wheel portion 62 which has been formed on the stator 56 and hence has likewise been fitted in torsion-resistant manner in the housing 12, in particular fitted in torsion-resistant manner to housing part 46 and to a further housing part 64, for example by being pressed in. On the stator 56 a second gearwheel 66 is rotatably supported. This second gearwheel 66 can be coupled with the first gearwheel 54 via a wrap-spring clutch 70 for transmission of torque. This will be discussed in detail in the following. The second gearwheel 66 exhibits an external tooth gearing 72 on its portion facing away from the first gearwheel 54. Said tooth gearing meshes with an external tooth gearing 73 of an output toothed wheel 74 which is supported in torsion-resistant manner on a spindle 76 of the nut/spindle arrangement 28.

It will be discerned in FIG. 2 that the spindle 76 is supported in the housing part 16 via a radial needle bearing 78 and a thrust bearing. On its outer periphery the spindle 76 exhibits a thread formation 80 in which rolling elements 82 are received. The rolling elements 82 are held in a rolling-element cage 84 which via a helical spring 85 is biased into its initial position shown in FIGS. 2 and 3. Supported on the rolling elements 82 is a nut 86 which in conventional manner executes a linear movement within the housing part 16 in the course of a rotary motion of the spindle 76. The nut 86 is firmly connected to a coupling element 88 which is displaced correspondingly in the course of the motion of the nut 86. At its free end the coupling element 88 exhibits a conical coupling surface 90 which is capable of being brought into engagement with a corresponding piston surface 92 in the interior of the piston 18 and is displaceable together with the piston 18 for the purpose of displacing the same and hence for the purpose of displacing the brake pad, which is not shown.

In FIG. 2 there will further be discerned a connecting cable 94 as well as various seals 96 in order to seal, or to guide in sealed manner, the housing parts in relation to one another and components linked thereto. Finally, it will also be discerned that the piston 18 has been sealed with a bellows 98.

Figure 3:
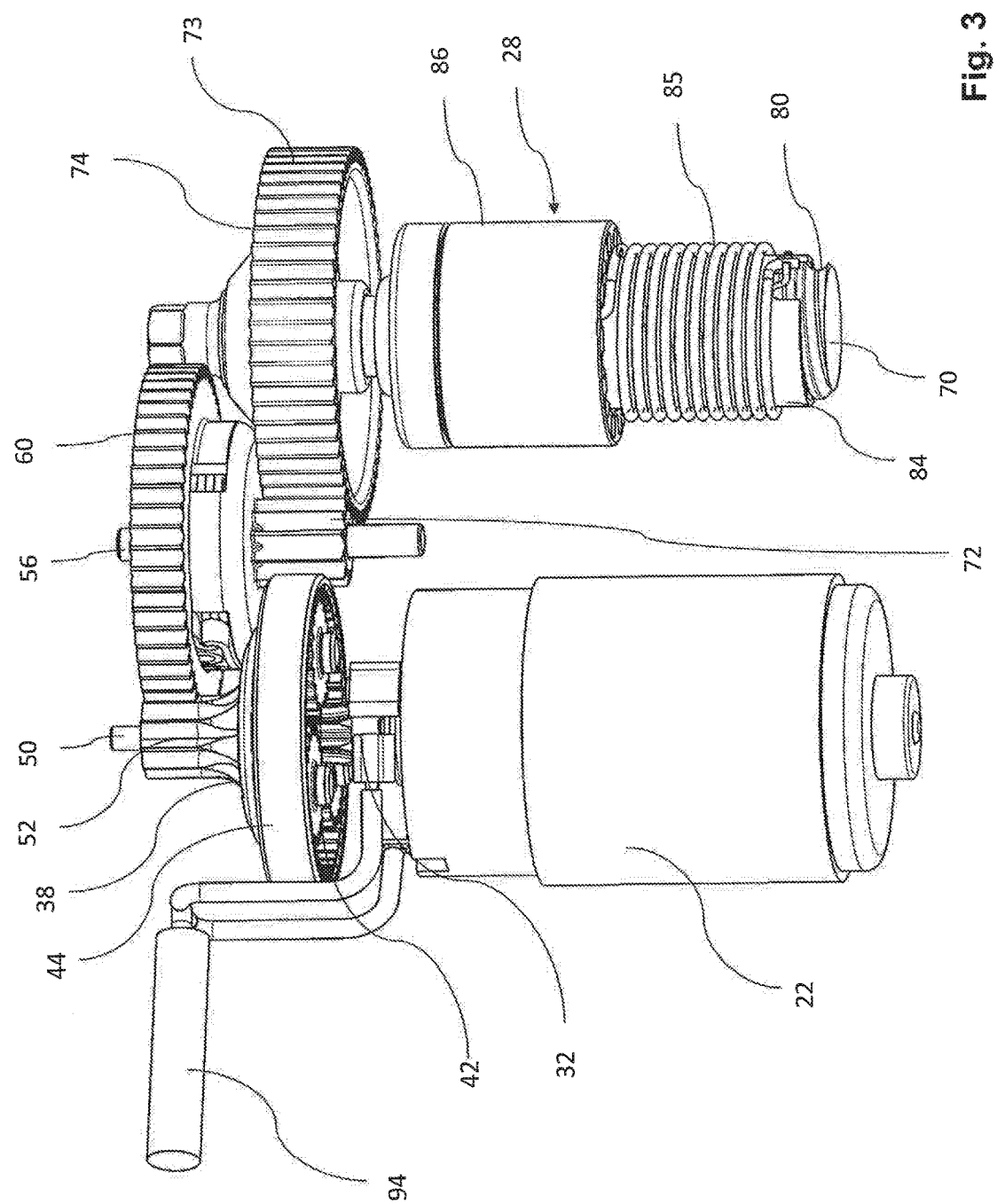
FIG. 3 is a cut-away view of the electric motor, the gear arrangement and the spindle.

Particulars of the displacement mechanism will be discerned in FIGS. 2 and 3.

Figure 4:
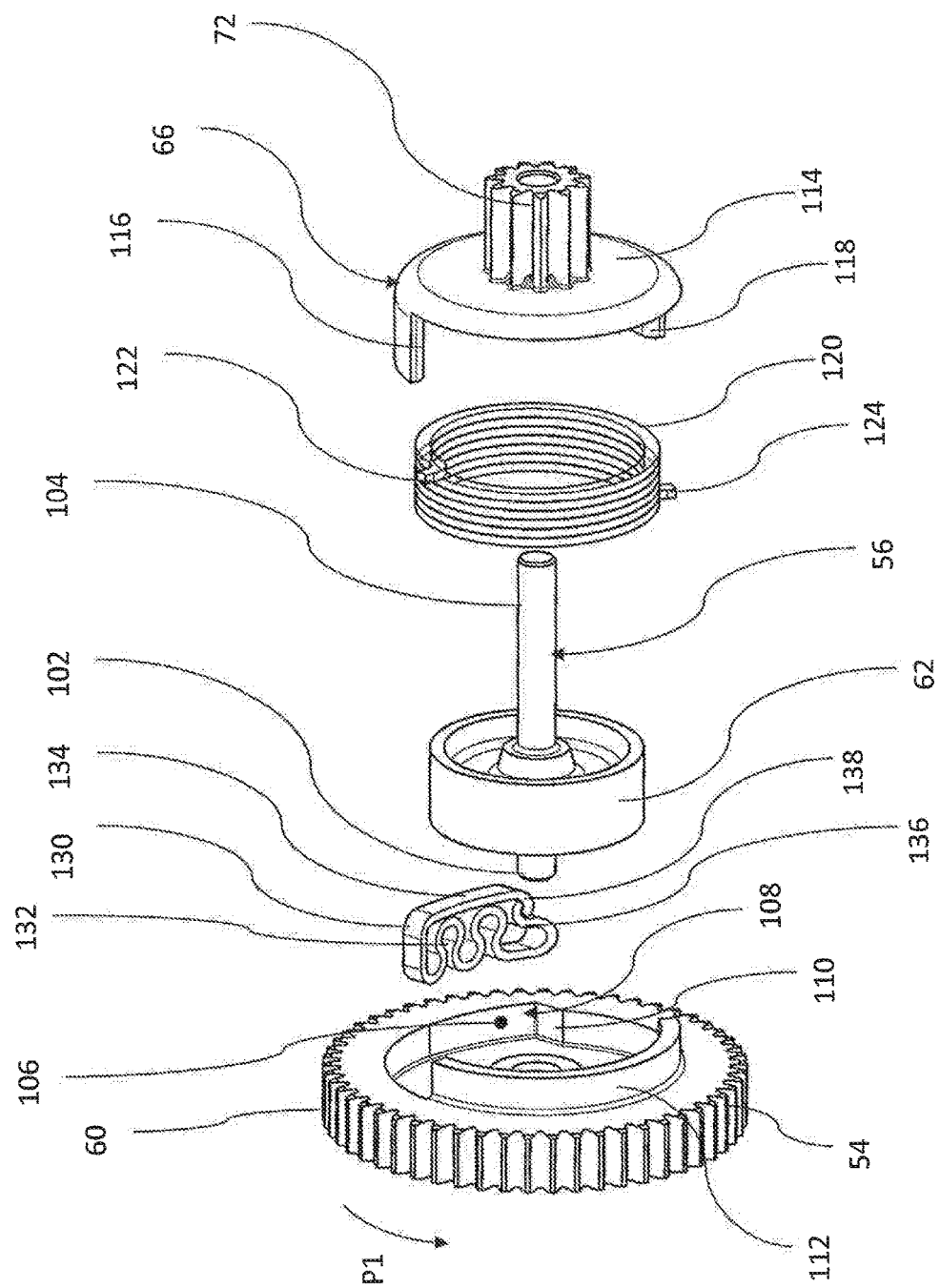
FIG. 4 is an exploded view for elucidating the wrap-spring clutch.
Figure 5:
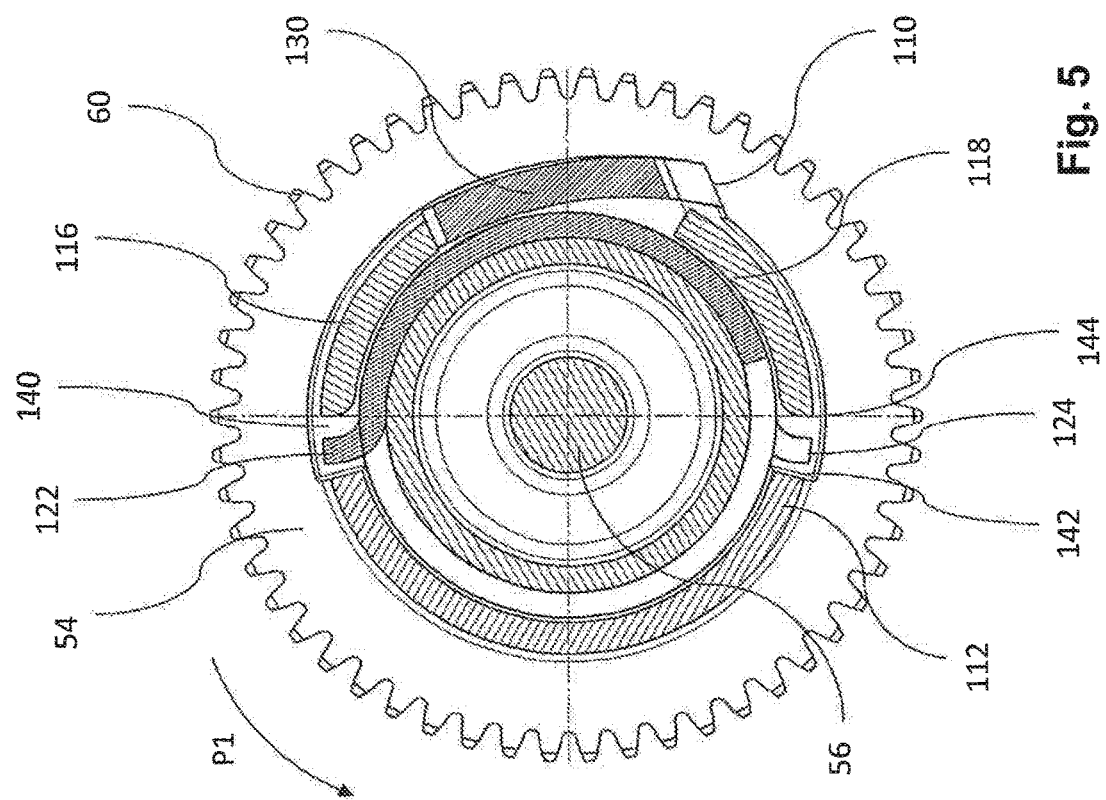
FIG. 5 is an axially orthogonal sectional view of the arrangement consisting of two gearwheels with wrap-spring clutch.

Turning now to FIGS. 4 and 5, the structure and the individual components of the wrap-spring clutch 70 will be discerned therein. The stator 56 with its friction-wheel portion 62 is provided in the interior of the wrap-spring clutch 70. As already stated, the stator 56 is supported in the housing so as to be fixed in relation to the housing and hence so as to be incapable of twisting via two journals 102, 104. The first gearwheel 54 is supported on the stator 56. Said gearwheel exhibits the external tooth gearing 60 on its outer periphery and is provided in its interior with a cavity 106. The cavity 106 is provided with a side pocket 108 with abutment surface 110. Furthermore, a circular-segment-shaped pawl 112 extends from a side surface of the first gearwheel 54. The second gearwheel 66 exhibits, besides its external tooth gearing 72, a plate-like structure 114 on which a first pawl 116 and a second pawl 118 are arranged which extend in the axial direction. Furthermore, in FIG. 4 a helical spring 120 with cranked ends 122 and 124 will be discerned. The helical spring 120 is dimensioned in such a manner that in the relaxed state it bears snugly against the outer peripheral surface of the friction-wheel portion 62 but is able to slide on said surface. For the purpose of assembly, the helical spring 120 is placed onto the friction-wheel portion 62. This arrangement is received in the cavity 106. The two cranked ends 122 and 124 extend outwards in the radial direction so far that they are capable, as will be elucidated in detail in the following, of being brought into engagement with the pawls 112, 116, 118 without rubbing along or scratching the surfaces bounding the cavity 106.

In FIG. 4 there will further be discerned a shaped spring 130 with several wound loops 132 which extend along a base strand 134. The two ends 136, 138 engage one another. The wound loops 132 can be compressed out of their relaxed position into a compressed position when a force F is acting. The shaped spring 130 is arranged in the pocket 108 and with its last loop bears against the contact surface 110.

The assembled state of the wrap-spring clutch 70 will be discerned in FIG. 5, in which connection it should be added that the cranked spring end 122 is received between pawl 116 and pawl 118 in the intermediate space 140.

Generally, the motor-vehicle brake described above is employed with its actuator assembly described above primarily for the purpose of activating a parking-brake function. This means that in the service-brake case the piston 18 is ordinarily displaced hydraulically in such a manner that it is displaced out of the housing part 16. Equally, it has to be possible that upon enabling of the motor 22 for the purpose of releasing the brake in the service-brake case the piston 18 is partly or entirely displaced back again into its initial position according to FIG. 2. As a rule, this happens solely by virtue of the effect of a relaxation on the brake pad, which is not shown, and also through the agency of the return spring 85, without a motor drive by the electric motor 42 being required for this. For the service-braking case, let it be noted that relatively small tensional forces are required.

In a parking-brake situation, the piston 18 is displaced with relatively large tensional force for the purpose of generating a parking-brake action and is intended to be held durably in this position in order to immobilise the motor vehicle securely. The piston position that has been reached should be maintained unconditionally for the purpose of retaining the parking-brake action, and the situation should be avoided where the piston 18 is displaced back in the course of time by virtue of settling processes in the gear arrangement 26. Only when an active drive via the motor 22 occurs, with which the parking brake is to be actively released, can the piston 18 be displaced back again into its initial position according to FIG. 2.

Accordingly, a distinction has to be made between the service-brake situation and the parking-brake situation, in which connection a flux of force from the piston 16 towards the motor 22 is to be permitted or prohibited, depending on the current state of the brake. In order to comply with this requirement, the wrap-spring clutch 70 is employed in the manner shown. The wrap-spring clutch 70 operates in interaction with the two gearwheels 54 and 66 as follows:

Firstly, let the flux of force from the motor-side gearwheel 54 be considered, i.e. the case in which the motor 22 is driven and drives the gearwheel 54 in rotation through the agency of the planetary gear 34. Here there are two directions of rotation, namely the direction of rotation of the gearwheel 54 in the anti-clockwise direction for tensioning the brake (tensioning the service brake and the parking brake) and the direction of rotation of the gearwheel 54 in the clockwise direction for active releasing of the brake (releasing of the parking brake).

In the course of a rotation of the first gearwheel 54 in the anti-clockwise direction corresponding to arrow P1—this corresponds to a motion for displacing the piston 18 out of the housing 16, i.e. for activating the brake via the motor 22 both in a service-brake situation and in a parking-brake situation—the shaped spring 130 is displaced towards pawl 116 via the contact surface 110. The greater the resistance becomes that pawl 116 sets against such a displacement (i.e. in the case of increasing tensional forces), the more strongly is the shaped spring 130 compressed. The helical spring 120 remains ineffective in the course of this actuation in the anti-clockwise direction corresponding to arrow P1, because its spring ends are able to move freely in the clearance between the pawls 112, 116 and 118, and it slides on the friction-wheel portion 62.

If greater tensional forces arise, as is the case in the course of the activation of the parking brake when the brake pads have to be pressed strongly against the brake disc via the piston 18, the shaped spring 130 is compressed more strongly. If the shaped spring 130 is compressed more strongly in consequence of a rotation corresponding to arrow P1, this means that the first gearwheel 54 has now been displaced relative to the second gearwheel 56 corresponding to the compression of the shaped spring 130. The maximum relative displacement is determined by virtue of the fact that pawl 112 bears with its end face 142, through the agency of the cranked end 124, against pawl 118 and the end face 144 thereof. Once this state has been reached, the shaped spring 130 has been maximally compressed, and any further rotation of the electric motor 22 is transmitted via the gear arrangement 26 to the nut/spindle arrangement 28 for further tensioning of the parking brake.

Once the parking brake has been tensioned, reaction forces resulting from the tensional force react on the transmission. These reaction forces, which are transmitted to pawls 116 and 118 via the nut/spindle arrangement 28, the output toothed wheel 74 and the external tooth gearing 72, try to push pawls 116, 118 back into their initial position—that is to say, to move them in the anti-clockwise direction. But as soon as pawl 116 tries to return to its initial state—that is to say, to move in the anti-clockwise direction—it comes into engagement with the cranked end 122 of the helical spring 120. In consequence of this mutual engagement, due to the tendency of pawl 116 to move in the anti-clockwise direction the helical spring 120 is tightened around the friction-wheel portion 62, so that the loops thereof narrow and act more strongly on the outer peripheral surface of the friction-wheel portion 62. This wrapping of the outer peripheral surface of the friction-wheel portion 62 has the result that the helical spring 120 cannot slide any further onto this external peripheral surface but, so to speak, clings to it. Accordingly, pawl 116 cannot move back into its initial position. The parking brake remains activated. A settling process is therefore ruled out.

For the purpose of releasing the parking brake, once again a drive of the motor 22 is required. This is effected in such a manner that the gearwheel 54 is rotated in the clockwise direction. If the gearwheel 54 moves in the clockwise direction corresponding to arrow P2—this corresponds to a motion for displacing the piston 18 into the housing 16, i.e. for active releasing of the brake via the motor 22 in the course of deactivating the parking brake—pawl 112 moves correspondingly likewise in the clockwise direction and releases the tension on the shaped spring 130. In addition, the helical spring 120 is released and sets pawl 118 free. Said pawl can—following pawl 112—move back, this occurring under the action of the return spring 85.

The wrap-spring clutch 70 accordingly has the general effect that for the parking-brake function it ensures that a transmission of torque from the motor to the nut/spindle arrangement also occurs in the case of high tensional forces and that settling effects or an inadvertent releasing of the parking brake is prevented by the action of the wrap-spring clutch 70, in particular by the action of the then tightening helical spring 120 acting firmly on the outer peripheral surface of the friction-wheel portion 62.

If merely a parking-brake function is to be realised, in which case the actuation in the service-brake case is effected purely hydraulically, the shaped spring 130 is an option and may be omitted.

But if with the brake both a service-brake function and a parking-brake function with electromechanical activation are to have been provided, additionally the shaped spring 130 is employed which deforms more or less strongly, depending on the current state of tension. In the case of low tensional forces such as ordinarily arise during service braking, the shaped spring 130 is deformed not at all or only to a slight degree, so that it, so to speak, keeps the helical spring 120 (wrap spring) inactive. As a result, a self-locking in the transmission can be prohibited for the service-brake function. A flux of force through the transmission in both directions between motor drive and nut/spindle arrangement is then possible. Only when the shaped spring 130 has been compressed sufficiently does the helical spring 120 (wrap spring) become active, so to speak, in its function and block a flux of force through the transmission from the nut/spindle arrangement towards the electric motor. The shaped spring 130 is accordingly required in the practical example shown, because both brake functions—service-brake function and parking-brake function—are to be made available.

Proceeding from this understanding of the embodiment according to FIGS. 1 to 5, the invention sets about an optimisation of this embodiment. A first practical example of the invention is shown schematically in the block diagram according to FIG. 6.

Figure 6:
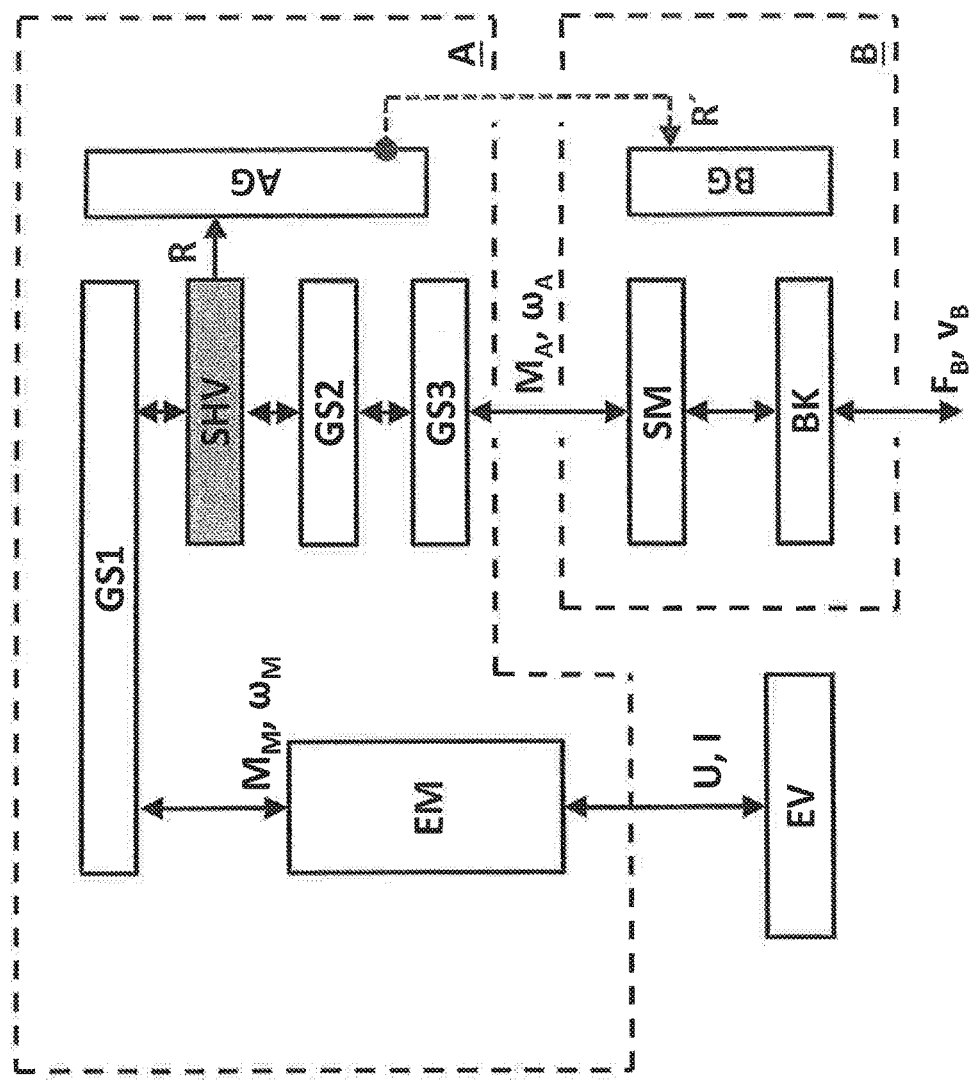
FIG. 6 is a schematic view of a first practical variant of the invention, in which the self-locking device is arranged between the first and second gear stages.

In FIG. 6 it can be discerned that the electric motor EM driven by an electrical supply source EV delivers a motor torque $M_M$ to a first gear stage GS1 of the gear arrangement via an output shaft and at an angular velocity of the motor $\omega_M$. Arranged between the first gear stage GS1 and the second gear stage GS2 is the self-locking device SHV, with which reaction forces R are diverted to the housing portion AG which is assigned to the gear arrangement with the individual gear stages GS1 to GS3 and to the electric motor EM. This housing portion may also be designated as the actuator housing portion AG. The reaction forces R can then be diverted to the housing portion of the brake BG by suitable coupling of the actuator housing portion AG and of the housing portion of the brake BG, elucidated in more detail in the following, corresponding to the dashed arrow R'.

Positioned downstream of the second gear stage GS2 is a further gear stage GS3, starting from which, and at an angular velocity of the actuator $\omega_A$, a torque $M_A$ is transmitted to the brake. The brake includes a spindle/nut arrangement SM of a ball screw and a brake piston BK, proceeding from which the brake-actuating force $F_B$ is transmitted to the brake pads at an actuation speed $v_B$. Reaction forces are retroactive from this brake piston BK in the braking case.

The peculiarity of this embodiment lies in the fact that the self-locking device SHV is arranged in such a manner that the two gear stages GS2 and GS3 are arranged between the ball screw with its spindle/nut arrangement SM and the self-locking device SHV. This makes it possible to exploit the transmission ratio of the two gear stages GS2 and GS3 as gear reduction for the retroactive reaction forces from the brake piston BK in a parking-brake situation, so that the reaction forces acting ultimately on the self-locking device SHV have been distinctly reduced. As a result, the self-locking device SHV can be dimensioned to be relatively small, thus saving construction space in particular. Furthermore, this arrangement of the self-locking device SHV offers freedom in the design and accommodation of the self-locking device SHV within the gear arrangement.

Figure 7:
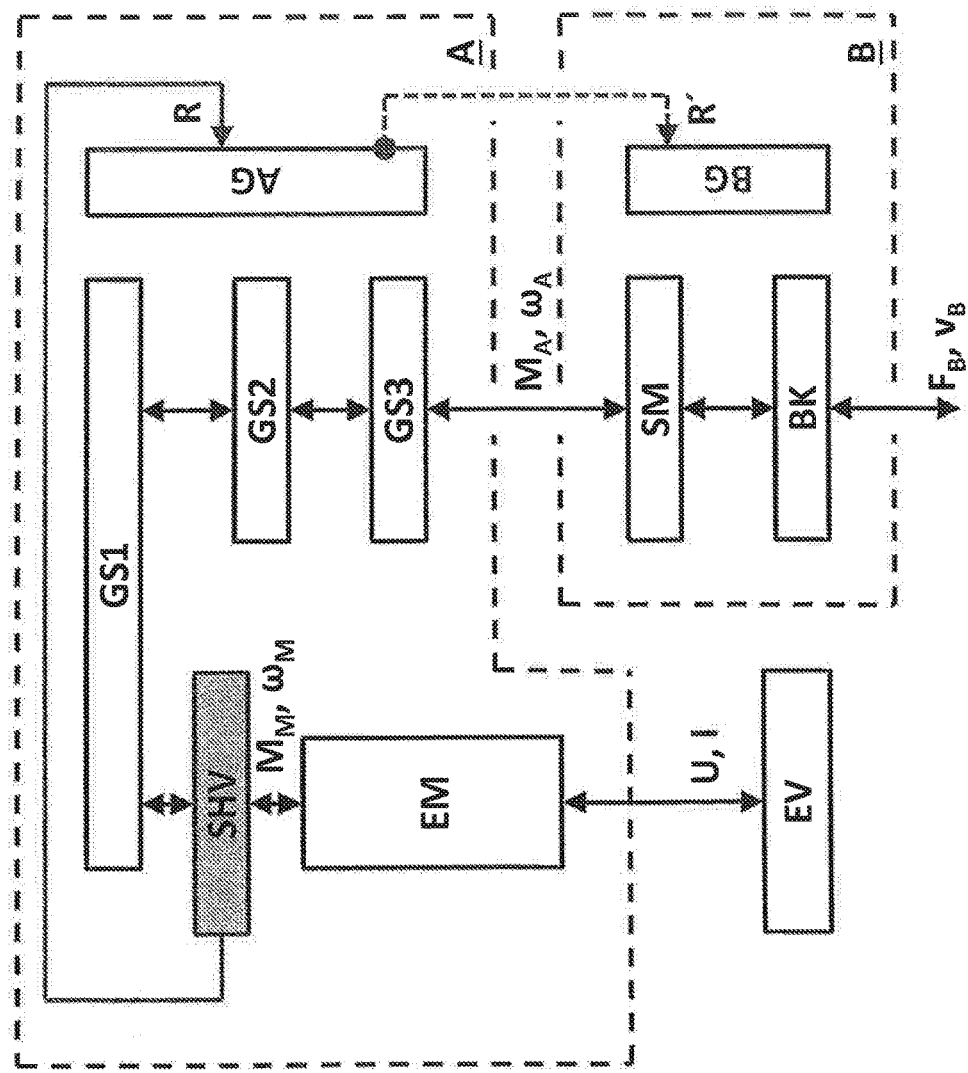
FIG. 7 is a schematic view of a second practical variant of the invention, in which the self-locking device is arranged between the motor drive and the first gear stage.

A further embodiment of the invention is shown in FIG. 7. Therein it will be discerned that the self-locking device SHV is arranged between the electric motor EM and the first gear stage GS1, so that the transmission ratio of all three gear stages GS1 to GS3 can be exploited as reduction gear for the retroactive reaction forces from the brake piston BK.

The advantages of the invention accordingly lie in the arrangement of the self-locking device SHV within the gear arrangement with the individual gear stages GS1 to GS3 relative to the actual components of the brake, namely the ball screw (spindle/nut arrangement SM). By virtue of this arrangement, transmission ratios of the gear stages GS1 to GS3 can advantageously be exploited in order to reduce the reaction forces. Furthermore, this arrangement offers greater variability relating to the saving of construction space.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A hydraulically and electromechanically actuatable motor-vehicle brake, with an actuator assembly comprising:
   a housing,
   an actuator, displaceable relative to the housing, for hydraulic or electromechanical displacement of a brake pad,
   a motor drive,
   a displacement mechanism arranged between the motor drive and the actuator,
   a gear arrangement assigned to the displacement mechanism, and
   a separate self-locking device which is designed to block the displacement mechanism as needed,
wherein the displacement mechanism exhibits a spindle drive with a spindle and a nut, wherein optionally the one component from spindle and nut is capable of being driven in rotation and the respective other component from spindle and nut is capable of being linearly displaced within the housing for the purpose of displacing the actuator by driving in rotation one component from spindle and nut,
wherein the gear arrangement exhibits at least three or four gear stages,
wherein the self-locking device is positioned downstream of a first gear stage nearest to the motor drive, wherein the self-locking device is arranged between the first gear stage and a second gear stage, wherein downstream of the second gear stage is a third gear stage arranged,
wherein the self-locking device is arranged in such a manner that at least the second and third gear stages are arranged between the spindle drive and the self-locking device,
wherein the motor drive exhibits an electric motor,
wherein the spindle drive is a ball screw,
wherein the gear arrangement exhibits a planetary gear mechanism,
wherein an output shaft of the electric motor exhibits a sun wheel of the planetary gear mechanism, in which connection a ring gear of the planetary gear mechanism is arranged to be fixed in relation to the housing, and in which connection planet wheels of the planetary gear mechanism are rotatably supported on a planet carrier which is rotatably supported in the housing, and
wherein the self-locking device is integrated into the sun wheel of the planetary gear mechanism.

2. The motor-vehicle brake according to claim 1, wherein the self-locking device is arranged between the motor drive and the gear arrangement.

3. The motor-vehicle brake according to claim 1, wherein the self-locking device is arranged in such a manner that the reaction forces arising in the course of blocking the displacement mechanism can be indirectly or directly diverted into the housing.

4. The motor-vehicle brake according to claim 3, wherein the self-locking device diverts the reaction forces arising in the course of blocking the displacement mechanism into a housing portion assigned to the gear arrangement, the housing portion being connected in force-transmitting manner to a housing portion bearing the brake-pad arrangement.

5. The motor-vehicle brake according to claim 1, wherein the self-locking device is designed with a wrap-spring clutch which permits a transmission of torque from the motor drive to the spindle and is designed for blocking a transmission of torque from the spindle to the motor drive.

6. The motor-vehicle brake according to claim 5, wherein a switching element is assigned to the wrap-spring clutch, which switching element in a first switching position permits a transmission of torque from the spindle to the motor drive and upon reaching a second switching position causes the wrap-spring clutch to block a transmission of torque from the spindle to the motor drive.

* * * * *